United States Patent [19]

Escriva et al.

[11] 4,131,986

[45] Jan. 2, 1979

[54] ELECTROSTATIC RECORDING HEAD HAVING WIRE STYLI AND METHOD OF MANUFACTURE

[75] Inventors: Vincent R. Escriva, Santa Clara; Suvrat Kirtikar, Stanford; Edward W. Marshall, Saratoga; Charles D. Minard, Sunnyvale, all of Calif.

[73] Assignee: Varian Associates, Inc., Palo Alto, Calif.

[21] Appl. No.: 289,407

[22] Filed: Sep. 15, 1972

Related U.S. Application Data

[63] Continuation of Ser. No. 59,269, Jul. 29, 1970, abandoned.

[51] Int. Cl.[2] .......... B21F 3/00; G11B 3/44

[52] U.S. Cl. .......... 29/592 R; 29/603; 156/174

[58] Field of Search .......... 29/592, 603; 156/168, 156/169, 172, 173, 174, 181; 140/71.5; 346/139 C, 74 ES

[56] References Cited

U.S. PATENT DOCUMENTS

| | | | |
|---|---|---|---|
| 2,966,727 | 1/1961 | Gallentine | 29/592 |
| 3,083,131 | 3/1963 | Wentz | 156/174 |
| 3,130,757 | 4/1964 | Schellack | 29/605 X |
| 3,157,721 | 11/1964 | Barish | 29/624 X |
| 3,333,279 | 7/1967 | Colen et al. | 156/172 X |
| 3,693,185 | 9/1972 | Lloyd | 29/592 X |
| 3,798,756 | 3/1974 | Bauerlen | 29/592 |

*Primary Examiner*—Michael J. Keenan
*Attorney, Agent, or Firm*—Stanley Z. Cole; Paul Hentzel; Edward J. Radlo

[57] ABSTRACT

Closely spaced windings of wire are laid down on a revolving drum and retained in place by an adhesive substrate previously mounted on the drum. The cylinder of wire with an adhesive substrate which is formed is cut and removed from the drum and spread into a flat sheet. The wire side of the sheet is placed in contact with the epoxied surface of an elongated plate. The plate traverses the wire sheet in a strip proximate one terminal edge thereof dividing the sheet into a major portion which will ultimately form the lead wires to the head and a minor portion which is trimmed off in later step. After the epoxy has dried, the adhesive substrate is removed and the newly exposed side of the wire is placed in contact with the epoxied surface of a second elongated plate. The two plates form an elongated sandwich containing the wire embedded in epoxy. The ends of the wire forming the minor portion are trimmed and the end surface of the sandwich is polished to form the finished recording head. The major portion of the wire sheet extending from the head is sectioned into groups of 50 or so for convenient termination onto printed circuit boards which may be plugged into the recorder electronics. The above technique is suitable for the manufacture of a 16" wire stylus recording head having 3840 styli (wire density of 240 styli to the inch).

10 Claims, 8 Drawing Figures

INVENTORS
VINCENT R. ESCRIVA
SUVRAT KIRTIKAR
EDWARD W. MARSHALL
CHARLES D. MINARD

BY Paul Wenzel
Leon F. Herbert
ATTORNEYS

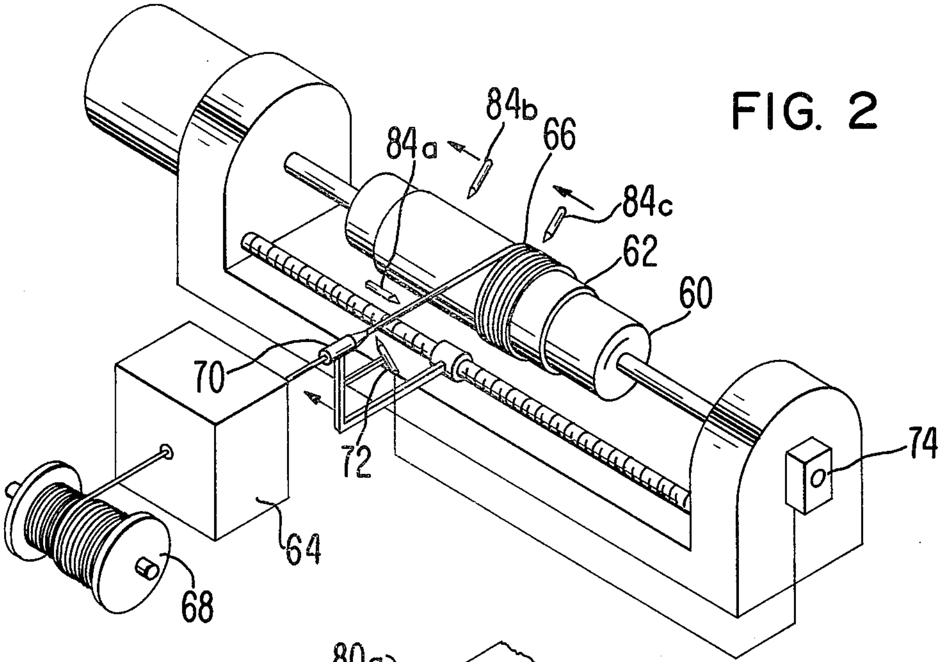
FIG. 2
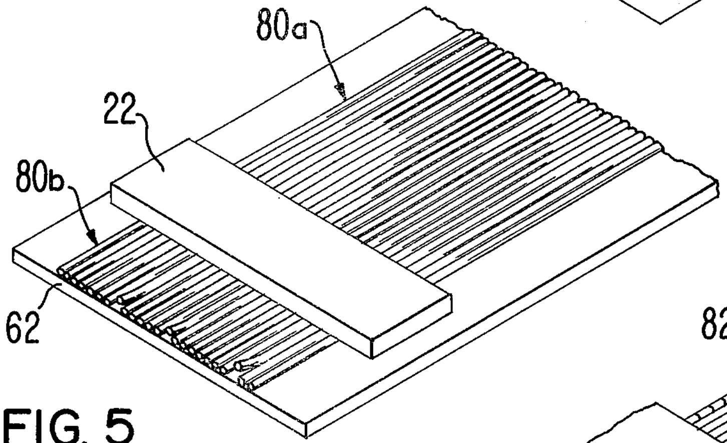
FIG. 5
FIG. 7
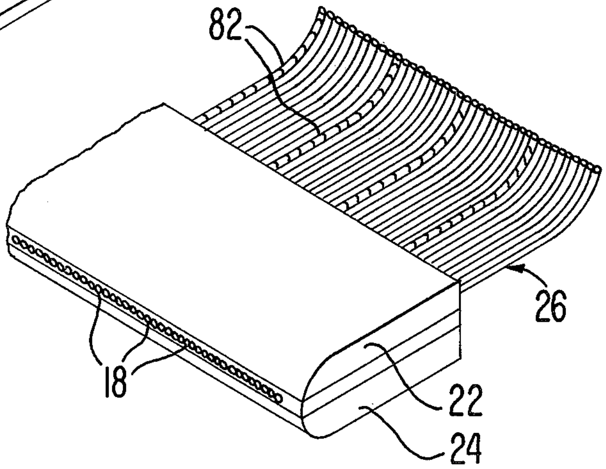
FIG. 6
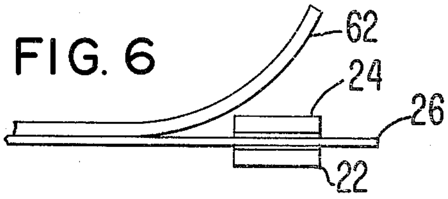
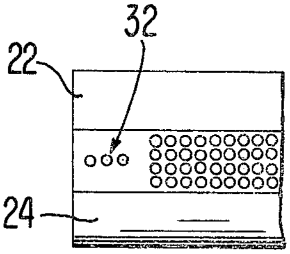
FIG. 8
INVENTORS
VINCENT R. ESCRIVA
SUVRAT KIRTIKAR
EDWARD W. MARSHALL
CHARLES D. MINARD
BY Paul F. Wenzel
Leon F. Herbert
ATTORNEYS

ELECTROSTATIC RECORDING HEAD HAVING WIRE STYLI AND METHOD OF MANUFACTURE

This is a continuation of application Ser. No., 59,269 filed July 29, 1970 now abondoned,

FIELD OF THE INVENTION

This invention relates to electrostatic recording heads and more particularly to such heads having wire styli and connecting leads.

DESCRIPTION OF THE PRIOR ART

Heretofore, a single layer wire stylus recording head has been manufactured by placing individual wires in parallel grooves formed on opposed plates and securing the plates together (U.S. Pat. No. 3,204,249 Shaler et al). Multilayered wire heads have been made by holding wires in a two-dimensional array using perpendicular comb structures and embedding the wires in plastic (U.S. Pat. No. 3,157,721 Barish). Using these wire mounting techniques it is difficult to obtain the high stylus density required in high resolution applications. High density wires are too small and too numerous to be effectively handled by these prior art devices.

Alternatively, the recording heads have been made by etching the conductive surface of a circuit board. The technique is extremely expensive, and the above-described density limitation is a problem because to etch properly the spacing between adjacent styli must be greater than the styli width. The lengths of etched recording heads are also limited because of the critical controls required during the etching process. Further, the circuit boards do not exhibit the same flexibility as wires, and cracking at the surface may produce electrical discontinuity in the styli which are extremely difficult to detect.

In both the wire mounting and etching techniques described above, once the manufacturing parameters and templates have been established, it is extremely difficult to change styli density and wire dimensions.

SUMMARY OF THE INVENTION

It is therefore an object of this invention to provide an improved wire head having a higher styli density; provide a wire head that is cheaper, more durable, and can be made having higher styli densities and greater lengths than heretofore; provide a method of manufacturing a wire head which permits control of styli the spacing and the aspect ratio of the styli; and provide an improved method of manufacturing a multilayered wire head.

BRIEF DESCRIPTION OF THE DRAWINGS

Further objects and advantages of the wire head and the manufacture and operation thereof will become apparent from the following detailed description taken in conjunction with the drawings in which:

FIG. 2 is a schematic isometric view showing a winding drum and tension control apparatus used in the manufacture of wire sheets;

FIG. 5 is a isometric view showing the wire side of the wire-adhesive sheet being mounted onto the epoxied surface of a first plate;

FIG. 6 is a sectional side view showing the wire sheet and epoxy sandwiched between opposed plates;

FIG. 7 is a isometric view showing the polished recording surface of the finished head; and FIG. 8 is a fragmentary end view of a multilayered embodiment of the recording head.

THE RECORDER SYSTEM

Figure 1:
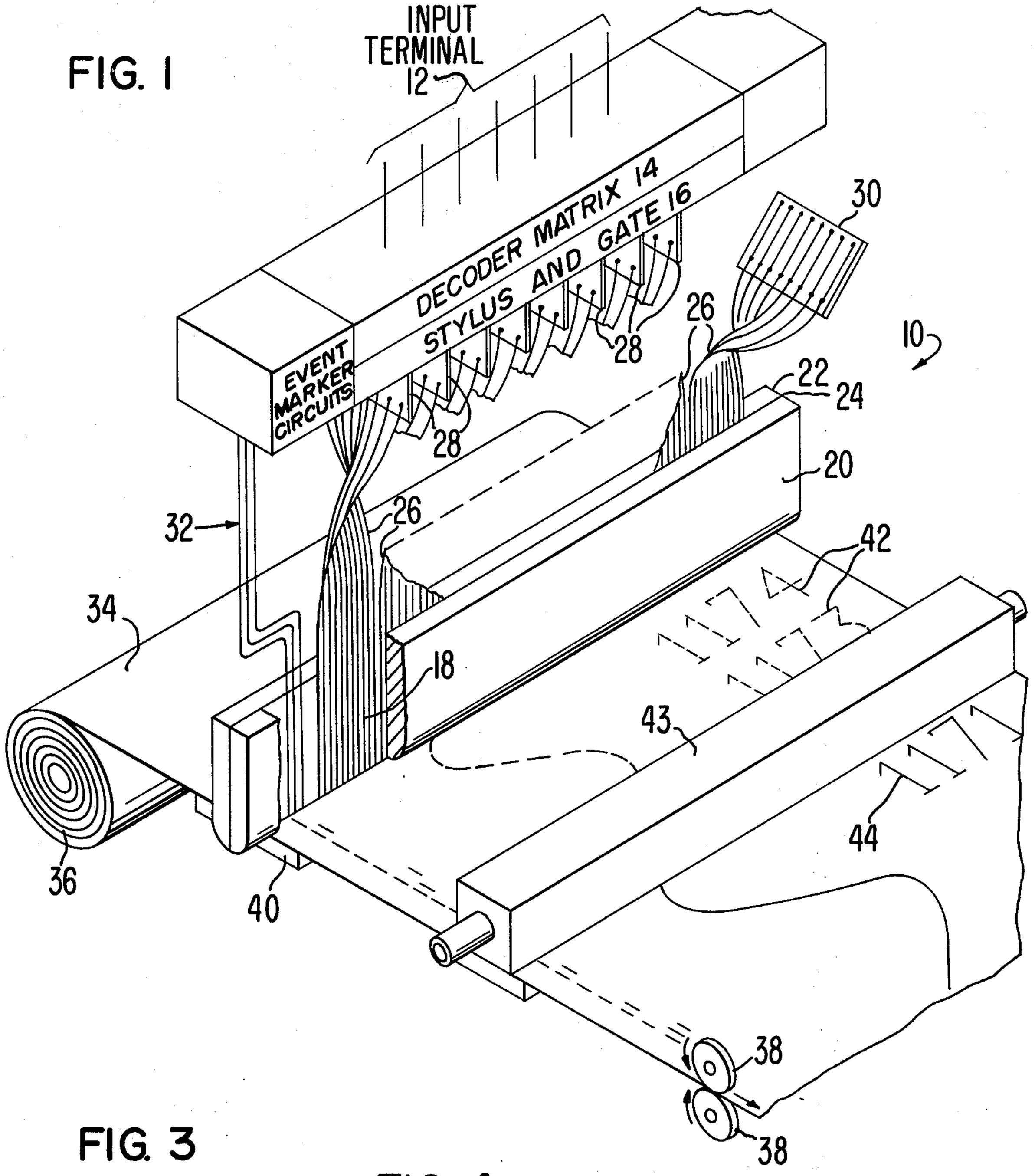
FIG. 1 is a schematic isometric view of an electrostatic recorder employing the improved wire styli head which is partially broken in section to show the wire sheet.

FIG. 1 schematically illustrates a recorder 10 having input terminals 12 which apply analog or digital input signals to a decoder matrix 14. The decoded signals are then processed by stylus AND gates 16 which activate selected ones of a plurality of wire styli or electrodes 18 mounted or embedded in plastic recording head 20. The recording head 20 is formed by opposed plates 22 and 24 which sandwich wire sheet 26 therebetween. The wire styli 18 in sheet 26 are sectioned off into groups of convenient numbers for termination onto circuit boards 28. The flexibility of the wires forming each section permit circuit boards 28 to be easily twisted and moved to plug into stylus AND gate 16. Circuit board 30 is shown disengaged for purposes of illustration and shows stylus wire terminations along one edge and a plug-in contactor's strip along the opposite edge. Event marker channels 32 are located on at least one end of head 20 and require styli of greater spacing. Particular modes of addressing and activating stylus 18 which may be employed here are more fully discussed in U.S. Pat. No. 3,394,383 and U.S. Pat. No. 3,465,360. A recording medium or web 34 is shown proximate recording head 20 with an air gap therebetween. Web 34 has a charge retentive surface or coating (dielectric film) over a conductive substrate (paper backing). Web 34 is stored on a supply roll 36 and is moved past head 20 by a pair of opposed friction drive wheels 38. Web 34 is urged into nominal engagement with head 20 by a backup electrode 40. Backup electrode 40 is normally held at about 550 volts and each stylus 18 is normally held at about 380 volts. This voltage difference of 170 volts (the priming voltage) is insufficient to cause writing (charge transfer onto the web). When a particular styli is selected by AND gate 16, that styli voltage drops to ground potential. The 550 volts then appearing between the selected styli and backup assembly 40 (the writing potential) is sufficient to cause charging or writing on web 34. The writing potential activates the selected styli causing discharge in the normally nonconductive fluid in the gap which is typically ordinary air. Other suitable fluids may be employed. The writing or charging path is from ground, through AND gate 16 and the selected styli, across the discharge in the gap, through web 34 and backup assembly 40, and returns to ground via a 550 volt source not shown. Charge accumlates on the charge retentive surface of web 34 proximate the selected styli. The selective activation of styli 18 in conjunction with the motion of web 34 creates an invisible latent charge image 42 (shown in dashed lines) on web 34 which is developed by a toning channel 43 to form a visible image 44. The toning or developing process is more fully disclosed in U.S. Pat. No. 3,392,706. Other addressing, activating, driving and toning techniques may be employed. The above-discussed techniques and apparatus are intended to be illustrative only.

FIG. 2 shows a winding drum 60 with an adhesive substrate 62 such as masking tape, a conventional wire handling tension device 64 and lathe apparatus required to manufacture wire sheet 26. Wire 66 is supplied by a damped rotating spool 68 into tension regulating apparatus 64. Wire 66 is threaded through a collet 70 and onto adhesive substrate 62 of winding drum 60. Collet or wire guide 70 moves parallel with respect to the axis of winding drum 60 in lathe action to progressively lay down wire 66 to form a wire-adhesive cylinder or helix on the wire receiving surface of winding drum 60. A color spray-solonoid apparatus 72 is provided for spraying a color indicator on wire 66 at predetermined intervals (every 50th turn for example) to facilitate sectioning wire sheet 26 and connecting the grouped styli 18 to circuit boards 28. The spraying intervals are determined by revolution counter 74 which may be set to activate the solonoid after a predetermined number of drum revolutions. The spacing between wires 66 which determines the ultimate styli density, may be easily altered by adjusting the relative motion between collet 70 and winding drum 60. Spacing programs may be provided to automatically cause the wider spacings between the event marker channels 32. Programmed spacings in the lathe drive mechanism may also be introduced to change the aspect ratio of styli 18. The aspect ratio is defined as the width of each writing unit or styli measured perpendicular to the direction of web motion over the height thereof (measured along the direction of web motion). Spacings may automatically be provided between every 2nd or 3rd styli. The grouped styli firing as a unit would have a higher aspect ratio (2 or 3 respectively). The flexible nature of the lathe action additionaly readily permits altering the wire spacing and grouping.

TABLE I

| Wires/ In | Size of Bare Wire | Size of Wire With Coating (mils) | Spacing Between Adjacent Wires (mils) | Recommended Tension Limit (ounces) |
|---|---|---|---|---|
| 80 | 8 mils | 10 | 4.5 | 8 |
| 104 | 5 mils | 6.5 | 4.6 | 3 |
| 120 | 35 gauge<br>3.9 mils | 5.0 | 4.3 | 2 |
| 160 | 39 gauge<br>3.1 mils | 3.5 | 3.2 | 1.3 |
| 184 | 40 gauge<br>2 mils | 2.4 | 3.4 | 0.5 |
| 208 | 1 mil | 2 (glass coated) | 3.8 | 0.12 |
| 240 | .7 mil | 1.7 (glass coated) | 3.45 | 0.06 |

At higher wire densities, smaller wire is laid down at lower tensions. Table I shows some suggested styli densities with appropriate wire diameters (with and without insulative coating) and laying down tensions. Even smaller wires with higher densities are desirable for facsimile and gray scale applications. Densities greater than 240/inch may be obtained by employing precision lathe and wire handling apparatus which can accommodate the delicate fine wire.

Variations in tension produce irregularities in the spacing of wire 66 during laying down. The wire spacing must be uniform across the portion of wire-adhesive cylinder which is later to be incorporated into the recording head. The round cross-section of winding drum 60 promotes uniform tension because the wire feed rate is constant. Other winding shapes may be employed, such as an oval or flattened drum. However, round drum 60 is preferred because wire is laid down at a constant speed which does not cause changes in tension.

Figure 3:
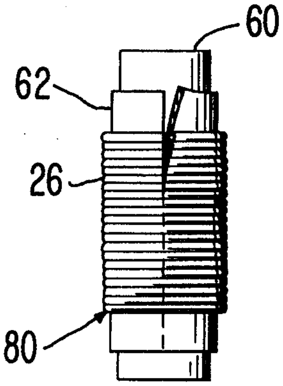
FIG. 3 shows a wire-adhesive cylinder being cut while mounted on the winding drum.
Figure 4:
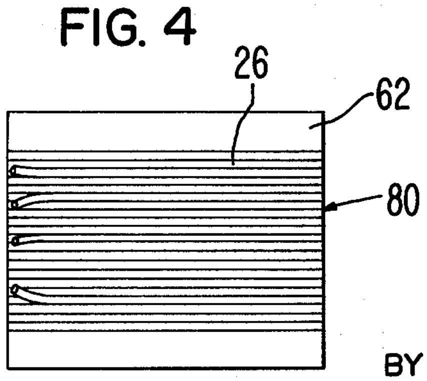
FIG. 4 shows a wire-adhesive sheet after removal from the winding drum.

FIG. 3 shows the wire-adhesive cylinder being cut longitudinally while on winding drum 60. The cutting action may displace some of the wire ends introduced by the cut. FIG. 4 shows a wire-adhesive sheet 80 formed from the wire-adhesive cylinder removed from winding drum 60. A Plate 22 with an epoxied surface is then placed against the wire side of wire-adhesive sheet 80 as shown in FIG. 5. Plate 22 divides wire-adhesive sheet 80 into a major portion **80*a* which ultimately becomes the stylus leads and a minor portion 80*b* which is trimmed off at a later step. After the epoxy has dried, adhesive 62 may be removed or peeled back as shown in FIG. 6. Before the epoxy dries, however, adhesive substrate 62 holds the individual wires of wire sheet 26 in position relative to one another. The epoxied surface of second plate 24 is then pressed. against wire sheet 26 opposed to first plate 22 as shown in FIG. 6. The displaced wires of minor portion 80*b* extending from the plate sandwich are trimmed and the edge surface of the plate sandwich polished to form the final recording head shown in FIG. 7. The major portion 80*a* of sheet 26 is then separated into sections of convenient numbers as indicated by colored wires 82, and terminated on circuit boards 28 as shown in FIG. 1. Then adhesive 62 may then be completely removed from major portion 80*a* of wire sheet 26** if desired.

Many techniques may be employed together or in the alternative to provide the adhesion between wires 66. Adhesive substrate 62 is convenient because it is easy to remove the wire-adhesive cylinder from drum 60 after cutting. Additionally, an adhesive substance can be applied to wire 66 just before wire 66 is laid down on drum 60 by an adhesive applicator **84*a*. Adhesive may also be laid down on drum 60 before wire 66 is laid down by applicator 84*b*, or laid down on wire 66 by applicator 84*c* after wire 66 has been laid down. Preferably, the adhesive is available as wire 66** is laid down to secure it in place immediately.

MULTILAYERED WIRE HEADS a multilayered wire head as shown in FIG. 8 may be formed by separately fabricating a plurality of wire-adhesive sheets and progressively mounting them on a plate employing epoxy between each layer. Alternatively, by employing any or all of the adhesive applicators **84*a*, 84*b*, and 84*c*** many wire layers may be wound on the winding drum concentrically. The multilayered wire sheet formed therefrom is then mounted between epoxy plates. A 16" multilayered head of 7 layers with a linear stylus density of 160/inch (total stylus 17,920) may be fabricated to conveniently print an entire line at a time. Adjacent styli in neighboring layers may be fired as a unit to decrease the aspect ratio. Adjacent styli in the same layer may be fired as a unit to increase the aspect ratio.

Clearly, various changes may be made in the structure and embodiments shown herein without departing from the concept of the present invention. For example, wire 66 may be multistranded to increase the number of wire turns laid down at the same drum rpm. Drum 60 could be increased in circumference so that more than one wire sheet 26 may be obtained from each wire-adhesive cylinder.

It will be apparent to those skilled in the art that the objects of this invention have been achieved by: (1) providing a revolving drum or wire-receiving surface activated by a lathe structure; (2) providing an adhesive for retaining the wires in place on the drum; (3) laying wire down on the drum in a progressive fashion; (4) forming a wire-adhesive sheet from the wire on the drum; and (5) mounting one terminal end of the wire sheet in a plastic head or an epoxy plate sandwich. The gearing and pitch mechanism of the lathe apparatus provides a highly flexible and convenient means for controlling and altering the wire spacing to produce uniform and programmed nonuniform wire spacing.

We claim:

1. A method of making a wire styli electrostatic recording head comprising the steps of:

providing a revolving surface for receiving the wires which form the styli and leads therefor;

placing an adhesive on the revolving surface for retaining the wires in position on said surface;

laying electrically conductive wire in an adjacent configuration onto the adhesive as the surface revolves to form a wire-adhesive helix member having at least one layer of wires;

forming a wire-adhesive sheet by completely severing the wire-adhesive helix member across the direction of the wires and removing it from the revolving surface; and fabricating a recording head by mounting one end of the wire sheet in a recording head structure and leaving the other end of the wire sheet extending from the recording head structure to form the lead wires.

2. The method of claim 1, wherein the revolving surface has a circular cross-section and the wire-adhesive helix is a cylinder.

3. The method of claim 2 wherein the wire is guided and progressively laid down at least one strand at a time by a collet means which progressively moves in a direction generally parallel to the axis of revolution of the revolving surface.

4. The method of claim 2 including the additional step of color coding the wire at predetermined intervals as the wire is laid down on the revolving surface to permit convenient identification of any particular wire.

5. The method of claim 1 wherein the adhesive is a substrate material placed on the revolving surface prior to the laying down of the wire.

6. The method of claim 1 wherein the adhesive is sprayed on the revolving surface prior to laying down of the wire.

7. The method of claim 1 wherein a plurality of layers of wire are formed.

8. The method of claim 1 wherein the spacing, if any, between adjacent pieces of wire is controlled during said wire laying step.

9. The method of claim 1 wherein said fabricating step comprises the substeps of cementing the non-adhesive side of one end of the wire-adhesive sheet onto a head half, removing the adhesive from this end of the wire-adhesive sheet, and cementing a second head half over the second side of this end of the resulting wire sheet so as to sandwich the wires between said head halves.

10. A method of making the wire styli electrostatic recording head comprising the steps of:

providing a revolving surface for winding at least one wire;

placing an adhesive on the revolving surface for retaining the wire in position on said surface;

laying electrically conductive wire in an adjacent configuration onto the adhesive as the surface revolves while controlling the spacing, if any, between adjacent pieces of wire to form a wire-adhesive cylinder having at least one layer of wire;

forming a wire-adhesive sheet by completely severing the wire-adhesive cylinder across the direction of the wire and removing said cylinder from the revolving surface; and fabricating a recording head by cementing the non-adhesive side of one end of the wire-adhesive sheet onto a head half, removing the adhesive from this end of the wire-adhesive sheet, and cementing a second head half over the other side of this end of the wires so as to sandwich said wires between said head halves.

* * * * *